Figures 1, 2:
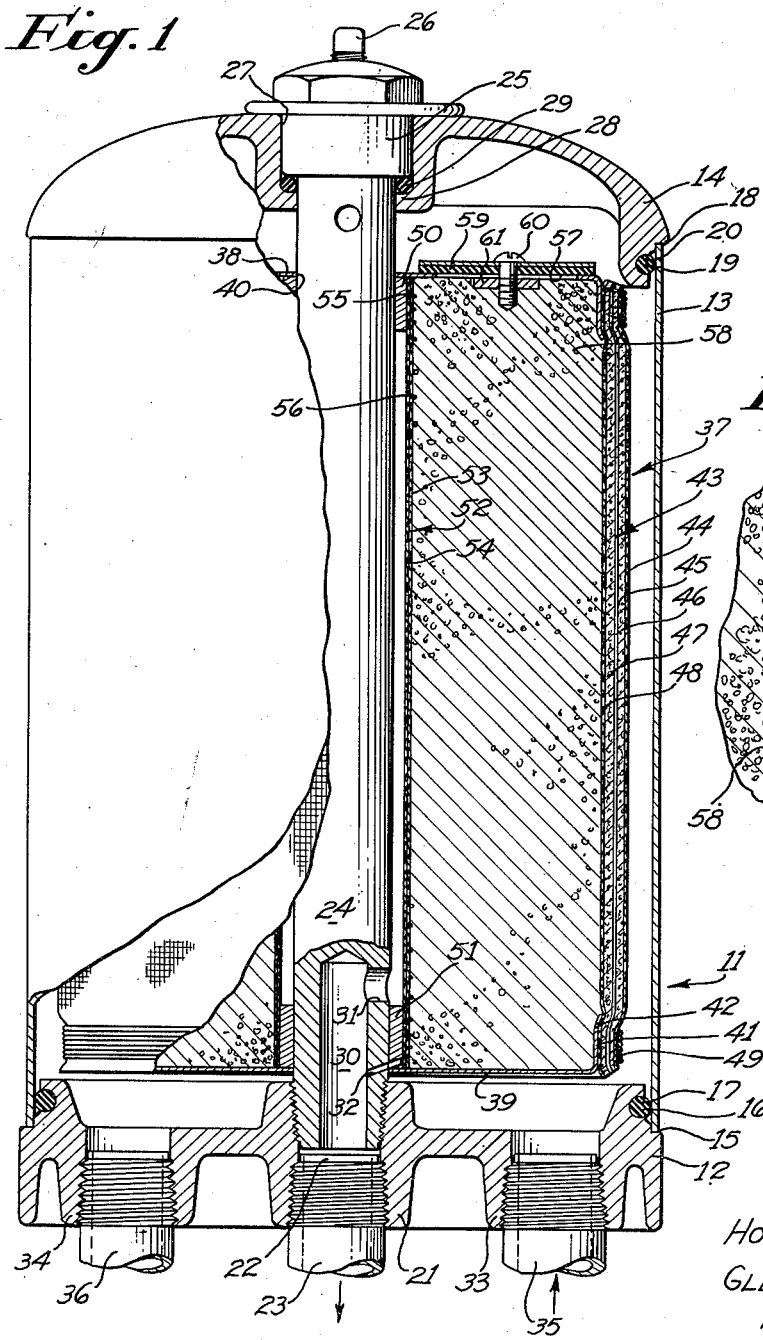

May 29, 1951 H. B. LEWIS ET AL 2,554,748
WATER FILTER
Filed June 28, 1946

INVENTORS:
HOWARD B. LEWIS,
GLEN M. LARSON,
BY THEIR ATTORNEYS
HARRIS, KIECH, FOSTER & HARRIS,
By

Patented May 29, 1951

2,554,748

UNITED STATES PATENT OFFICE 2,554,748

WATER FILTER

Howard B. Lewis and Glen M. Larson, Los Angeles, Calif., assignors to Broadbent-Johnston, Inc., El Monte, Calif., a corporation of California Application June 28, 1946, Serial No. 679,997

3 Claims. (Cl. 210—131)

This invention relates to a filter and purifier for liquids, and, since it finds particular utility in the field of water filtration, embodiments thereof adapted for such use are hereinafter described as illustrative of the invention and the advantages thereof, it being understood that our invention is not restricted to such use.

Among the objects of our invention is the provision of a filter for water which is superior to filter devices heretofore employed, in the removal of a greater percentage of the impurities therein and the removal of impurities of smaller dimensions than obtainable with such devices heretofore available.

It is a further object of our invention to provide a device for purifying water which accomplishes the foregoing object while passing water therethrough at a commercially acceptable rate and for a substantially longer period of time than is possible with devices heretofore available before the efficiency of the filtering unit is impaired or destroyed.

Another object of our invention is to provide a water purifying device having a filtering and purifying unit therein which may be readily removed when its efficiency is impaired and replaced by a new purifying and filtering unit.

Still another object of our invention is the provision of a water purifying device, the efficiency of which may be quickly and easily restored when impaired by the passage of water therethrough in one direction by passing a wash water therethrough in the opposite direction to agitate and remove the deposited impurities therefrom.

Another object of our invention is the provision of a device having the properties above described which is compact in construction, economical in manufacture, and positive in operation.

An embodiment of our invention capable of accomplishing the foregoing objects and providing the advantages contemplated by them and other advantages is described in the following specification, which may be more readily understood by reference to the accompanying drawing in which Fig. 1 is a side elevational view partially sectioned of a filtering and purifying device of our invention; and Fig. 2 is an enlarged fragmentary sectional view of the primary filter means or outer walls of the removable unit illustrated in Fig. 1.

Referring to the drawing, which is for illustrative purposes only, the numeral 11 indicates a container which includes a base 12, a cylindrical body 13, and a removable cap 14. The base 12 is provided with an annular shoulder 15 upon which the lower end of the cylindrical body 13 is seated, with the inner surface of the cylindrical body 13 in fluid-tight engagement with a gasket 16 mounted in an annular groove 17 in the base 12 a short distance above the shoulder 15. The gasket 16, as illustrated, is preferably in the form of an O-ring of rubber, neoprene, or the like.

The cap 14 likewise is provided with an annular shoulder 18 against which there is seated the upper end of the cylindrical body 13. An upper gasket 19, similar to the gasket 16, is disposed in an annular groove 20 in the cap 14 and is in fluid-tight engagement with the cap 14 and the cylindrical body 13 a short distance below the shoulder 18.

The base 12 is provided with a central annular boss 21 having therethrough a cylindrical passage 22 threaded adjacent its upper and lower ends. An outlet pipe 23 is threaded into the lower end of the cylindrical passage 22, and a supporting member 24 is threaded into the upper end of the cylindrical passage 22. The supporting member 24 is provided at its upper end with a hub 25 with a reduced threaded portion 26 thereabove. The hub 25 is adapted for reception within a central cavity 27 in the cap 14. An inwardly projecting flange 28 is formed at the bottom of the cavity 27, and a gasket 29, similar to the gaskets 16 and 19, is interposed between the flange 28 and the hub 25 to secure the supporting member 24 and the cap 14 in fluid-tight engagement.

The supporting member 24 is provided at its lower end with a liquid passage 30 which communicates with the cylindrical passage 22 in the base 12 and with the outlet pipe 23. One or more primary connecting passages 31 connect the liquid passage 30 to the exterior of the supporting member 24 a short distance above the base 12, and one or more secondary connecting passages 32 connect the liquid passage 30 to the exterior of the supporting member 24 between the primary passages 31 and the base 12.

The base 12 is provided with bosses 33 and 34 which are offset from the center of the base 12 and provided with threads for the reception of the threaded ends of an inlet pipe 35 and a waste pipe 36, respectively.

The purifying and filtering unit is indicated generally by the numeral 37, which includes upper and lower caps 38 and 39, respectively, generally cup-shaped in form, each provided with a central cylindrical opening 40 for the reception of the supporting member 24 and with a vertical inwardly turned peripheral flange 41. Flanges 41 terminate in outwardly converging lips 42.

The outer wall of the unit 37 constitutes a primary filter means 43 and includes an outer tube or covering 44 of reticulated material or fine mesh inert as to water. A material well adapted for such use is glass cloth of mesh approximating 500 to the square inch. Adjacent the tube 44 is a cushioning tube 45 comprising a bed or blanket of deformable and resilient material inert as to water in the form of fibres which are intermeshed and intertwined. We have found that glass fibres are admirably suited for this purpose.

Within the tube 45 and in contact therewith is a filtering tube or layer 46 formed of long asbestos fibres intertwined and intermeshed with each other. In contact with the inner side of the filtering tube 46 is a second cushioning tube 47 having properties and formed of material similar to the cushioning tube 45. Within the second cushioning tube 47 is an inner tube or covering 48 similar to the outer tube or covering 44 previously described.

The tubes 44 to 48, inclusive, constituting the primary filter means 43 are clamped upon the flange 41 of the lower cap 39 as by a wire 49 or similar tie wound therearound, the lip 42 serving to prevent the removal of the primary filter means 43 therefrom. The tubes 44 to 48, inclusive, are secured in a similar manner to the flange 41 of the upper cap 38. The unit 37 includes upper and lower sleeves 50 and 51, respectively, which are mounted within the unit 37 and in contact with the upper cap 38 and the lower cap 39, respectively, and adapted to be received upon the supporting member 24.

A secondary filter means 52, constituting the inner wall of the unit 37, is positioned upon the sleeves 50 and 51 and extends between the upper and lower caps 38 and 39. The secondary filter means 52 includes an outer tube 53 of reticulated material impervious to water, such as the outer tube 44 previously described, and an inner tube 54 of reticulated material, such as stainless steel or the like. The tubes 53 and 54 are held upon the sleeves 50 and 51 by a tie of wire or the like, as indicated by the numeral 55, and the tubes 53 and 54 may be held together by spaced ties 56 around the outer tube 53, such ties being longitudinally spaced along the tubes.

Formed in the upper cap 38 of the purifying and filtering unit 37 is one or more openings 57 through which a purifying material, such as particles of carbon, indicated by the numeral 58, may be charged to the interior of the unit 37, filling the space between the caps 38 and 39 and the primary filter means 43 and the secondary filter means 52. Each opening 57 is closed by a closure 59 secured by a screw 60 to an elongated plate 61 extending across the opening 57 and engaging the lower surface of the upper cap 38 on each side thereof.

With the device assembled as illustrated in the drawing, water to be purified is admitted through the inlet pipe 35, passes through the primary filter means 43, thence through the body of carbon 58, and, after passing through the secondary filter means 52, flows between the secondary filter means 52 and the supporting member 24, through the primary connecting passage 31 into the liquid passage 30 in the supporting member 24, and thence through the cylindrical passage 22 in the base 12 into the outlet pipe 23.

In its passage through the primary filter means 43 the water first passes through the outer tube 44 of glass cloth where any very coarse impurities are filtered from the water.

Thereafter in its passage through the cushioning tube 45 the glass fibres remove from the water finer but yet relatively coarse impurities. Thereafter, as the water passes through the filtering tube 46 between the intermeshed and intertwined long fibres of asbestos, minute impurities considerably smaller than those removed by filters heretofore in use are caught and withheld. Each of the long fibres of asbestos comprises a bundle of extremely small fibres, the ends of which project from the bundle at random intervals throughout its length. While the bundles themselves are intermeshed and intertwined to form a fibrous mass having filtering properties of substantial value, the projecting ends of the individual fibres or strands thereof likewise are intermeshed and intertwined to provide interstices of considerably smaller dimensions and having therefore superior filtering properties.

We have found that, if a layer or bed of intermeshed and intertwined long fibres of asbestos is supported only by a substantially rigid and non-deformable reticulated support, as, for example, a metal screen, and water is passed therethrough, the asbestos soon becomes matted and substantially impervious to the flow of water, so that it is ineffective for filtration purposes. We have found that, when the layer or bed of intermeshed and intertwined long fibres of asbestos is supported in the manner hereinbefore described in our apparatus, the asbestos does not become matted or impervious to the flow of water therethrough for an extremely long period of time.

While we do not wish to be bound by the theory, we think it possible that, when the asbestos in such form is supported upon a relatively rigid member, the ends of the strands or individual fibres projecting from the bundles of fibres in the mass and constituting tenacles become tenaciously engaged with the supporting member when the asbestos is placed in contact therewith, and the number of these tenacious engagements increase constantly with variations in the fluid pressure thereon until there is formed at the interface of the supporting member and the asbestos a matted and impervious mass. In accordance with this theory we think it possible that, when the bed of asbestos fibres is supported upon a cushioning layer, as in our apparatus, while there is some engagement of the loose ends of the asbestos fibres with the cushioning layer when the two are placed in contact, the number of such engagements does not increase substantially, or at least to a degree seriously impeding the passage of water therethrough responsive to variations in the fluid pressure thereon, because the fibres of the cushioning layer work or move relative to each other and relative to the asbestos, just as the asbestos fibres move relative to each other and relative to the cushioning layer in response to variations in fluid pressure thereon, and this relative movement of the fibres of the cushioning layer and the asbestos fibres frees the engagements of the asbestos fibres with the cushioning layer to maintain the number of such engagements below that value seriously impeding the passage of water therethrough.

When it is desired to revive the property of the purifying and filtering unit 37 for passing water therethrough, the inlet pipe 35 may be closed, and the waste pipe 36, closed during the normal operation of the device, is opened and water is passed into and through the outlet pipe 23. This reverse flow of water through the unit serves to agitate and wash from the secondary filter means 52 and the particles of carbon 58 the impurities deposited thereon in a manner to impede the flow of water therethrough. This reverse flow of water through the unit also serves to wash out of the primary filter means 43 the impurities deposited thereon in a flow-impeding manner. Hence the property of the unit 37 for passing water therethrough and removing impurities therefrom is revived.

The secondary connecting passage 32 communicating with the lower end of the purifying and filtering unit 37 within the lower cap 39 serves to drain the water therefrom during and following the normal operation of the device.

While those embodiments of this invention hereinbefore illustrated and described are fully capable of performing the objects and accomplishing the advantages primarily stated, it will be understood that this invention is not restricted to the specific embodiments hereinbefore set forth but includes all modifications coming within the scope of the claims which follow.

We claim as our invention:

1. A filtering unit for filtering liquids, comprising: a primary tubular filtering means composed of an outer reticulated tubular covering, a first tubular blanket of compressible fibrous material within and adjacent said outer covering, a tubular layer of loosely admixed and overlapping long asbestos fibers within and adjacent said first tubular blanket, a second tubular blanket of compressible fibrous material within and adjacent said layer, and an inner reticulated tubular covering within and adjacent said second blanket; a secondary tubular filtering means within and spaced from said primary filtering means; and a purifying medium disposed between said primary and secondary filtering means.

2. A filtering unit for filtering liquids, comprising: a primary tubular filtering means composed of an outer relatively stiff tubular covering of reticulated glass filaments, a first tubular blanket of compressible fibrous material within and adjacent said outer covering, a tubular layer of loosely admixed and overlapping long asbestos fibers within and adjacent said first tubular blanket, a second tubular blanket of compressible fibrous material within and adjacent said layer, and an inner relatively stiff tubular covering of reticulated glass filaments within and adjacent said second tubular blanket; a secondary tubular filtering means within and spaced from said primary filtering means; and a purifying medium disposed between said primary and secondary filtering means.

3. A filtering unit for filtering liquids, comprising: a primary tubular filtering means composed of an outer tubular covering of glass cloth, a first tubular blanket of loosely matted glass fibers within and adjacent said tubular covering, a tubular layer of loosely admixed and overlapping long asbestos fibers within said first tubular blanket, a second tubular blanket of loosely matted glass fibers within and adjacent said tubular layer, and an inner tubular covering of glass cloth within and adjacent said second tubular blanket; a secondary tubular filtering means within and spaced from said primary filtering means; and a purifying medium disposed between said primary and secondary filtering means.

HOWARD B. LEWIS.
GLEN M. LARSON.

REFERENCES CITED

The following references are of record in the file of this patent:

UNITED STATES PATENTS

| Number | Name | Date |
| --- | --- | --- |
| 632,570 | Howard | Sept. 5, 1899 |
| 1,405,406 | Genter | Feb. 7, 1922 |
| 2,103,434 | Pennebaker | Dec. 28, 1937 |
| 2,212,647 | Nugent | Aug. 27, 1940 |
| 2,250,299 | Downing | July 22, 1941 |
| 2,347,384 | Winslow | Apr. 25, 1944 |
| 2,369,857 | Russell et al. | Feb. 20, 1945 |

FOREIGN PATENTS

| Number | Country | Date |
| --- | --- | --- |
| 501,176 | Great Britain | Feb. 22, 1939 |